Dec. 25, 1951 C. S. WRIGHT 2,579,893
COMBINATION LEVEL AND ANGLE INDICATOR FOR CYLINDRICAL MEMBERS
Filed Sept. 21, 1949 2 SHEETS—SHEET 1
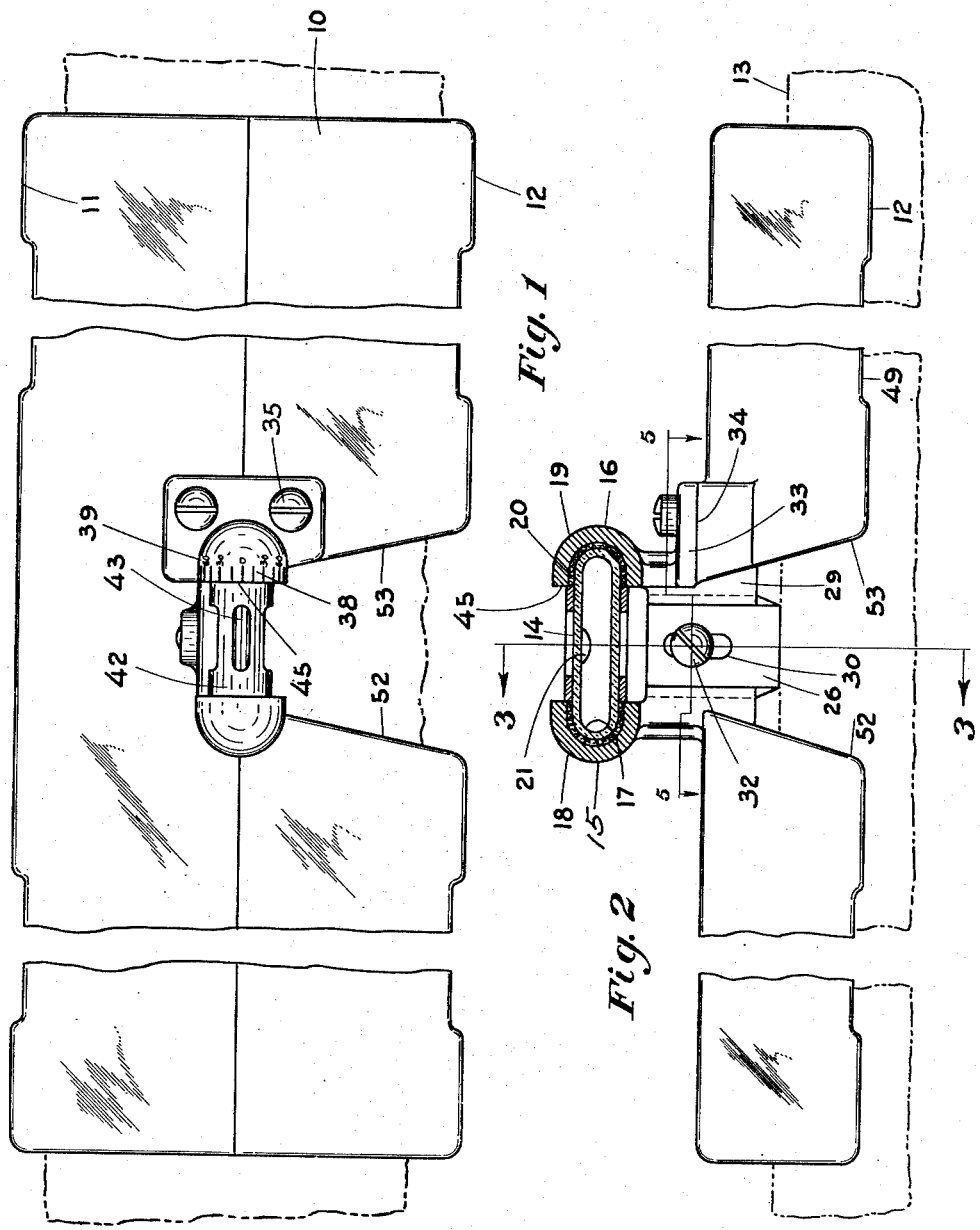
CHARLES S. WRIGHT
INVENTOR.
BY
ATTORNEY Dec. 25, 1951 C. S. WRIGHT 2,579,893
COMBINATION LEVEL AND ANGLE INDICATOR FOR CYLINDRICAL MEMBERS
Filed Sept. 21, 1949 2 SHEETS—SHEET 2
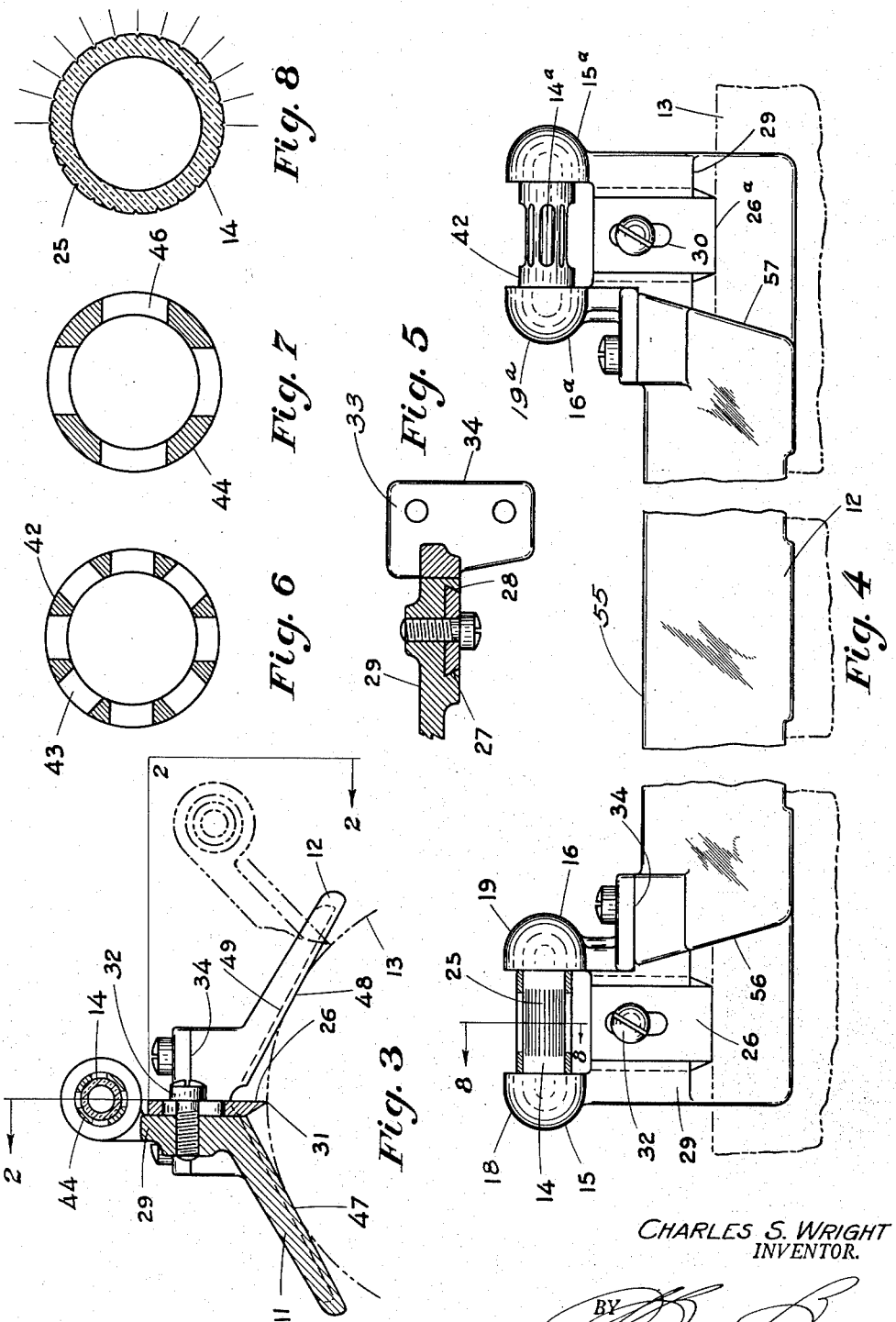
CHARLES S. WRIGHT
INVENTOR.
BY
ATTORNEY Patented Dec. 25, 1951

2,579,893

UNITED STATES PATENT OFFICE 2,579,893

COMBINATION LEVEL AND ANGLE INDI-
CATOR FOR CYLINDRICAL MEMBERS

Charles S. Wright, Woodside, N. Y.

Application September 21, 1949, Serial No. 116,922

11 Claims. (Cl. 33—211)

This invention relates to a combination level and angle indicator, for use on long shafts and rollers, to simultaneously level the shaft, and indicate the angular position at which the level is held.

In lining up long shafts and rollers, such as rollers used on printing presses, and the like, it is often necessary to line up a shaft or roller, at one or more angular positions, around the circumference.

This is frequently necessitated by obstructions on the shaft or roller, or by locating points, such as aligning points, and the like, which are located at various angular positions around the circumference.

The ordinary spirit level, while it is suitable for flat surfaces, cannot be used accurately for long shafts and rollers, where no flat surface is available.

While levels to indicate angular positions around short length of shafts have been available, they are not suited to levelling long shafts and rollers, in which the shaft level must be located with a high degree of accuracy, due to the large variation in height from one end to the other, which results from even a slight angular displacement of a long roller.

Where a portion of a roller becomes bent or bowed in installation, or service, it is necessary to accurately locate the exact position of the distorted portion of the shaft or roller, both linearly and angularly, in order to enable the roller to be straightened.

The object of my invention is to provide a level which may be accurately seated on a section of a long shaft, or roller, to accurately level the shaft, at various angular positions.

A further object is to provide a level in which the angular position can be scribed or marked, at various points along the shaft length, to enable keyways, or indicator marks to be located in accurate angular alignment with one another, at various points along a long shaft.

Another object is to provide a level, which although primarily designed for use in angular locations, can be used for conventional levelling of flat, cylindrical, or curved parts in the conventional manner.

A primary object is to provide a combination level and angle indicator, which is relatively simple, rugged in construction, can be used and maintained by persons without special skills, and which will maintain its accuracy over sustained periods without adjustment or periodic maintenance, while reducing to a minimum the accurate machine work required, and close tolerances required in manufacturing the unit, so that it can be produced in moderate quantities, at relatively low cost.

The accompanying drawings, illustrative of several embodiments and modifications of my invention, together with the description of their construction and the method of operation and utilization thereof, will serve to clarify further objects and advantages of my invention.

In the drawings:

Fig. 1 represents a plan view of one embodiment of the combination level and angle indicator.

Fig. 2 is a vertical section through the level tube and supports of Fig. 1, and a partial front elevation of the unit of Fig. 1, taken at 2—2, Fig. 3.

Fig. 3 is a vertical section through the level tube and support, taken at 3—3, Fig. 2, and a partial section through the unit, moved through an angle around a roller.

Fig. 4 is a front elevation of a modification of the combination level and angle indicator, of Fig. 1.

Fig. 5 is a cross-section through the scribe slide, and slide support, taken at 5—5, Fig. 2.

Fig. 6 is a cross-section through one embodiment of the level guard tube, taken at 8—8, Fig 4.

Fig. 7 is a cross-section through a modification of the level guard tube, of Fig. 6.

Fig. 8 is a cross-section through the level tube of Figs. 1 and 2, showing the location of the angular graduations.

It will be understood that the following description of the construction and operation of the combination level and angle indicator, is intended as explanatory of the invention and not restrictive thereof.

In the drawings, the same reference numerals designate the same parts throughout the various views, except where otherwise indicated.

One embodiment of the unit, as indicated in Figs. 1, 2 and 3, comprises a base 10, formed with two angular legs 11 and 12, which form a set of V-ways, which fit over the outer circumference of a shaft or roller 13, as indicated in Fig. 3, with a level tube 14, supported substantially at the center of the base, above the top of the legs by a support 15, formed integral with one side of the base, the other side of the tube being mounted in a removable bracket 16, attached to the base.

The base and tube support may be cast in one piece of an aluminum alloy, or other suitable material, or built up of sheet material and shaped members, welded or otherwise attached to one another.

The level tube 14, may be formed with hemispherical or other suitable form of ends 17, which are supported in similarly shaped heads 18 and 19, formed integral with the support and bracket, respectively, a formed sheet packing 20, being inserted between the tube and the interior of the head, to protect the tube against vibration.

The tube may be filled with any suitable type of liquid, a small air space being left within the tube to form a bubble 21, at the top of the liquid, in the conventional manner.

A plurality of angular graduation lines 25 may be etched or engraved around the outer circumference of the tube, as indicated in Figs. 4 and 8, to show the angular position of the tube and level, when a level reading is taken.

A scribe slide 26 may be mounted at substantially the center of the base, below the tube, the forward edge of the slide being located in substantial alignment with the center line of the tube. The sides 27 of the slide may be bevelled to fit the V-slot ways 28, formed in the substantially vertical center section 29, of the base, as indicated in Fig. 5.

A parallel-faced slot 30, the ends of which may be rounded, may be formed in the center of the slide 26, as indicated in Fig. 4, to enable the slide to be moved upward or downward, until the knife edge 31, formed by bevelling one face of the slide, engages the outer circumference of the roller or shaft 13, as indicated in Fig. 3, to enable the operator to scribe a line on the shaft or roller, in alignment with the center-line of the level tube.

A fillister head or other suitable form of screw 32, may be threadably mounted in the vertical center section of the base, the body of the screw fitting the slot 30, in the slide, to limit the movement of the slide, in both directions, the screw head clamping the slide against the wall of the center-section.

The removable bracket 16, may be formed with a substantially flat base or flange 33, which is supported on a flat raised pad 34, formed integral with the base, as indicated in Figs. 1 and 2, a plurality of screws 35, fitted through openings formed in the flange, and threadably supported in the pad 34, clamping the flange against the pad.

In addition to the angular graduation marks on the level tube, a plurality of angle graduation lines 38, may be embossed or engraved around the inner edge of the outer circumference of the removable bracket head 19, as indicated in Fig. 1, the angular positions corresponding with the graduation lines on the tube, to facilitate reading the angular tube position.

The numerical figures 39, indicating the angle of the engraved lines, may be stamped or engraved, as indicated in Fig. 3, the figures being shown at all lines, or at alternate lines depending upon the number of graduation lines formed around the circumference.

A guard tube 42, formed of brass or other suitable tubing, may be mounted around the outer circumference of the level tube, as indicated in Figs. 1 and 2, to protect the tube against abrasion.

The guard tube may be fixed, and have a plurality of parallel-faced slots 43, formed therein, as indicated in Fig. 6, the number of slots corresponding with the number of angular indicator points engraved on the outer circumference of the tube.

In another modification of the guard tube construction shown in Fig. 7, the guard tube 44 may be rotatably supported on the level tube, between the parallel faces 45 of the bracket heads. A plurality of wider parallel-faced slots 46, may be cut through the outer circumference of the tube, as indicated in Fig. 7, the tube being rotated to bring one of the slots into alignment with the angular graduation line corresponding to the level bubble, when the unit is mounted on a shaft, at an angle, as indicated in dot-dash lines, Fig. 3.

In order to clear any obstructions that may appear on the outer circumference of a shaft or roller, or any distorted sections of the shaft, the contact surfaces 47 and 48, forming the V-section of the angular legs of the body may extend over only a portion of the body length, the intermediate sections 49 being cut back, as indicated in Fig. 3.

The center section of the forward leg 12, of the body may be cut out to clear the scribe slide, the edges 52 and 53 of the cut-away section sloping outward, as indicated in Figs. 1 and 2.

Fig. 4 shows a modification of the level and angle indicator of Figs. 1 and 2, which is essentially the same as that of Figs. 1 and 2, except that two level tubes 14 and 14a, are mounted adjacent the outer edges of the base 55, in place of the single tube.

The construction of the base 55, is essentially the same as that shown in Fig. 3, with two angular legs 11 and 12 extending outward to form a set of V-section ways.

In the same manner, the contact surfaces 47 and 48 of the angular legs extend over only a portion of the length of the base, the intermediate sections 49 being cut back, as indicated in Fig. 3.

The level tubes are supported in substantially the same manner as the single tube, shown in Figs. 1 and 2, one side of each tube being supported by an integral support 15 or 15a, formed integral with the base, with the opposite end supported in a removable bracket 16 or 16a, attached to the base.

The heads 18 and 19, formed integral with the support and bracket, respectively, are essentially the same as those shown in Fig. 2, the tube being supported in the same manner.

A pair of scribe slides 26 and 26a may be mounted below the level tubes, the forward edge of each of the slides being located in alignment with the center line of the corresponding level tube.

The slides are each supported by screw 32, a slot 30 being formed at the center of each slide to clear the screw and permit adjustment of the vertical position of the slide, to enable the bottom of the slide to engage the outer circumference of the shaft, or roller, to locate the scribe line.

The angular graduation lines 25 may be formed on both level tubes, in the same manner as those shown in Figs. 4 and 8.

The angle graduation lines, shown on the head of the removable bracket 16 of Fig. 1, may be engraved around the inner end of the circumference of each removable bracket head 19 and 19a, or the head graduations may be omitted on one or both sides, depending upon the requirements of a particular installation.

The guard tubes 42 or 44, may be mounted on the level tubes 14 and 14a, in essentially the same manner, as those shown in Figs. 1, 6 and 7, or the guard tubes may be eliminated entirely.

The outer ends of the forward leg 12, of the frame may be cut away to clear the slide, the edges 56 and 57 sloping outward, as indicated in Fig. 4.

In place of the two scribe slides 26 and 26a, shown in Fig. 4, one in alignment with each tube, a single scribe slide may be mounted at the center of the base, even though the level tubes are mounted at the ends.

The forward face of the central slide 26 would be in alignment with the center-line of the tubes 14 and 14a, in the same manner as that shown in Figs. 1 and 2, and hereinbefore described.

The base of the single tube level of Fig. 1, or the multiple tube unit of Fig. 4, may be made of any length, to suit the requirements of a particular application.

Similarly, the width of the legs may be made longer, or shorter, than those indicated, and the angle between them may be altered, depending upon the size and type of roller or shaft, on which the unit is to be used.

In place of the V-section between the frame legs, the inner surface of the legs may be made in the form of a circumferential section, where the unit is to be used on one or more sizes of shaft over a sustained period.

Instead of being cast in one piece, the frame may be made of individual sheet metal or plate legs, welded or brazed together, with the brackets bolted, welded or brazed to the built-up frame.

The width and form of the slide may be altered, considerably, to suit a particular application.

The angular ways supporting the sides of the slide may be made straight, with a ledge formed in or attached to the rear wall, to support the slide. The angle of the ways may be altered considerably, depending upon the size of the slide.

The angle graduation lines, formed around the outer circumference of the level tube, may be etched, engraved, or formed in any other suitable manner, depending upon the material of which the tube is made.

The guard tube may be one of the types shown in Figs. 6 and 7, or the number and position of the slots in the tube may be altered to suit particular requirements.

The guard tube may also be eliminated entirely, where the level tube is of sufficient strength.

On long units for exceptionally long shafts, additional level tubes, in addition to those shown near the ends of the base in Fig. 4, may be added, either between the tubes, or beyond the ends of the tubes, depending upon the overall length of the unit.

In multiple tube units, a scribe slide may be mounted below each tube, as indicated in Fig. 4, a single slide may be mounted at the center, or a plurality of slides may be located at various points along the base to enable a long line, connecting the individual scribe lines to be drawn.

Where a plurality of tubes are used, individual slides may be mounted in alignment with some of the tubes, and omitted at other locations.

The levels shown in Figs. 1, 2 and 4, may be used on flat surfaces in place of the conventional type of level, in addition to its utilization for angular locations on shafts and rollers.

To facilitate its application to flat surfaces, the outer edge of both legs of the base, may be machined flat at the bottom, both edges being in one plane, to facilitate mounting the level against a flat surface.

Where a greater flat area is required, extension flanges may be formed integral with the legs, beyond the edges of the legs, the flanges being machined flat in one plane, to facilitate utilization of the level against flat surfaces.

It will be apparent to those skilled in the art, that my present invention is not limited to the specific details described above and shown in the drawings, and that various further modifications are possible in carrying out the features of the invention, without departing from the spirit and scope of the appended claims.

What I claim is:

1. A combination level and angle indicator, adapted for use on substantially cylindrical objects, comprising a relatively long base, a pair of angular legs formed integral with said base, said legs forming a V-way between the contact surfaces thereof, the area between the contact surfaces being undercut to form a plurality of spaced contact areas, said surfaces being adapted to contact the outer circumference of the object, a liquid-filled level tube mounted substantially parallel to the axis of said base, said tube having a plurality of angular graduations formed around the outer circumference thereof, means supporting said tube on the base, and means mounted in substantial alignment with the longitudinal center-line of said tube for indicating the angular location of the tube on the object.

2. A combination level and angle indicator, adapted for use on objects of substantially circular cross-section, comprising a base, angular legs formed integral with said base, said legs forming a V-way between the mounting faces thereof, a liquid-filled level tube mounted substantially parallel to the axis of said base, said tube having a plurality of angular graduations formed around the outer circumference thereof, means supporting said tube on the base, and means mounted in substantial alignment with the longitudinal axis of the tube, for locating the angular position of the tube on the outer circumference of the object.

3. A combination level and angle indicator adapted for locating the longitudinal axis of objects of substantially circular cross-section, comprising a relatively long base, angular legs formed integral with said base, said legs forming a V-way between the mounting surfaces thereof, the area between the contact surfaces of said legs being undercut to form a plurality of spaced contact areas a liquid-filled level tube mounted longitudinally of said base, said tube having a plurality of angular graduations formed around the outer circumference thereof, a plurality of support members attached to said base, said support members supporting the level tube, and means slidably supported by said base, in substantial alignment with the longitudinal center-line of the tube, for indicating the angular position of the tube on the outer circumference of the object.

4. A combination level and angle indicator adapted for locating the longitudinal axis of substantially cylindrical objects, comprising a base relatively long, angular legs formed integral with said base, said legs forming a V-way between the mounting surfaces thereof, the area between the contact surfaces of said legs being undercut to form a plurality of spaced contact areas, a liquid-filled level tube mounted longitudinally of said base, said tube having a plurality of angular graduations formed around the outer circumference thereof, a plurality of support members attached to said base, said members supporting the level tube, the head of one of said members having a plurality of angular graduations formed around the outer circumference thereof, in substantial alignment with the tube graduations, to indicate the angular position of the level tube bubble, with relation to the normal base position and means slidably supported by said base, in substantial alignment with the longitudinal axis of the tube, for indicating the angular position of the tube on the outer circumference of the object.

5. A combination level and angle indicator for locating the longitudinal axis of objects of substantially circular cross-section, comprising a relatively long base, angular legs formed integral with said base, said legs forming a V-way between the mounting surfaces thereof, the area between the contact surfaces of said legs being undercut to form a plurality of spaced contact areas a liquid-filled level tube mounted parallel to the axis of said base, said tube having a plurality of angular graduations formed around the outer circumference thereof, a plurality of support members attached to said base, said members supporting the level tube, a substantially tubular guard mounted around the outer circumference of the tube, said guard having a plurality of substantially radial slots formed therethrough, and means slidably supported by said base, in substantial alignment with the longitudinal center line of the tube, for indicating the angular position of the tube on the outer circumference of the object.

6. A combination level and angle indicator adapted for locating the longitudinal axis of substantially cylindrical objects, comprising a relatively long base, angular legs formed integral with said base, said legs forming a V-way between the mounting surfaces thereof, the area between the contact surfaces of said legs being undercut to form a plurality of spaced contact areas a liquid-filled level tube mounted parallel to the axis of the base, said tube having a plurality of angular graduations formed around the outer circumference thereof, a plurality of support brackets, one of said brackets being formed integral with the base, means attaching the other bracket to the base, said brackets supporting the level tube, a wall formed integral with the base, between the support brackets, and a plate slidably supported by said wall, one face of said plate being in substantial alignment with the longitudinal axis of the tube, the free edge of said plate being adapted to contact the outer circumference of the object, to indicate the angular position of the tube.

7. A combination level and angle indicator adapted for locating the longitudinal axis of objects of substantially circular cross-section, comprising a relatively long base, angular legs formed integral with said base, said legs forming a V-way between the mounting surfaces thereof, the area between the contact surfaces of said legs being undercut to form a plurality of spaced contact areas a liquid-filled level tube mounted parallel to the axis of said base, said tube having a plurality of angular graduations formed around the outer circumference thereof, a plurality of support members, attached to the base, said members supporting the level tube, a wall formed integral with the base, between the support members, a plate slidably supported by said wall, one face of said plate being in substantial alignment with the longitudinal center-line of the tube, and means for clamping the plate against the wall of the base, the free edge of said plate being adapted to contact the outer circumference of the object, to indicate the angular position of the tube.

8. A combination level and angle indicator, adapted for locating the longitudinal axis of substantially cylindrical objects, comprising a relatively long base, angular legs formed integral with said base, said legs forming a V-way between the mounting faces thereof, the area between the contact surfaces of said legs being undercut to form a plurality of spaced contact areas a plurality of liquid-filled level tubes, mounted substantially parallel to the axis of said base, said tubes being located in substantial axial alignment with one another, adjacent the ends of said base each of said tubes having a plurality of angular graduations formed around the outer circumference thereof, the angular graduations on said tubes being in substantial alignment with one another, the indications on each of said tubes serving as a check on the opposite tube in aligning the longitudinal axis and angular position of the object means supporting said tubes on the base, and means mounted in substantial alignment with the longitudinal axis of the tubes for indicating the angular position of the tubes, on the outer circumference of the object.

9. A combination level and angle indicator, adapted for locating the longitudinal axis of objects of substantially circular cross-section, comprising a base, angular legs formed integral with said relatively long base, said legs forming a V-way between the mounting faces thereof, the area between the contact surfaces of said legs being undercut to form a plurality of spaced contact areas a plurality of liquid-filled level tubes mounted substantially parallel to the axis of the base, said tubes being located in substantial axial alignment with one another, adjacent the ends of said base each of said tubes having a plurality of angular graduations formed around the outer circumference thereof, the angular graduations on said tubes being in substantial alignment with one another, the indications on each of said tubes serving as a check on the opposite tube in aligning the longitudinal axis and angular position of the object means supporting the tubes on the base, and a plurality of plates slidably mounted on said base, one face of each of said plates being in substantial alignment with the longitudinal center-line of the tubes, the free edge of each of said plates being adapted to contact the outer circumference of the object, to indicate the angular position of the tubes.

10. A combination level and angle indicator, adapted for locating the longitudinal axis of objects of substantially circular cross-section, comprising a relatively long base, angular legs formed integral with said base, said legs forming a V-way between the mounting faces thereof, the area between the contact surfaces of said legs being undercut to form a plurality of spaced contact areas a plurality of liquid-filled level tubes mounted substantially parallel to the axis of the base, said tubes being located in substantial axial alignment with one another, adjacent the ends of said base each of said tubes having a plurality of angular graduations formed around the outer circumference thereof, the angular graduations on said tubes being in substantial alignment with one another, the indications on each of said tubes serving as a check on the opposite tube in aligning the longitudinal axis and angular position of the object means supporting the tubes on the base, a plurality of plates slidably mounted on said base, one face of each of said plates being in substantial alignment with the longitudinal center-line of the tubes, and means for clamping each of said plates against the base, the free edge of each of said plates being adapted to contact the outer circumference of the object, to indicate the angular position of the tubes.

11. A combination level and angle indicator, adapted for locating the longitudinal axis of objects of substantially circular cross-section, comprising a relatively long base, angular legs formed integral with said base, said legs forming a V-way between the mounting faces thereof, the area between the contact surfaces of said legs being undercut to form a plurality of spaced contact areas a plurality of liquid-filled level tubes, mounted substantially parallel to the axis of the base, said tubes being located in substantial axial alignment with one another, adjacent the ends of said base each of said tubes having a plurality of angular graduations formed around the outer circumference thereof, the angular graduations on said tubes being in substantial alignment with one another, the indications on each of said tubes serving as a check on the opposite tube in aligning the longitudinal axis and angular position of the object means supporting the tubes on the base, a substantially tubular guard mounted around the outer circumference of each of said tubes, each guard having a plurality of substantially radial slots formed therethrough, and a plurality of plates slidably mounted on said base, one face of each of said plates being in substantial alignment with the longitudinal center-line of the tubes, the free edge of each of said plates being adapted to contact the outer circumference of the object, to indicate the angular position of the tubes.

CHARLES S. WRIGHT.

REFERENCES CITED

The following references are of record in the file of this patent:

UNITED STATES PATENTS

| Number | Name | Date |
|---|---|---|
| 372,921 | Long | Nov. 8, 1887 |
| 548,329 | Stemmerich | Oct. 22, 1895 |
| 986,783 | Tschop | Mar. 14, 1911 |
| 1,020,020 | Brawley | Mar. 12, 1912 |
| 1,211,882 | Schade | Jan. 9, 1917 |
| 1,361,367 | Coxey | Dec. 7, 1920 |
| 1,749,980 | Loeser | Mar. 11, 1930 |
| 2,193,693 | Leuchtenburg | Mar. 12, 1940 |
| 2,316,777 | Fell | Apr. 20, 1943 |